United States Patent [19]

Myers

[11] Patent Number: 5,625,644
[45] Date of Patent: Apr. 29, 1997

[54] DC BALANCED 4B/8B BINARY BLOCK CODE FOR DIGITAL DATA COMMUNICATIONS

[76] Inventor: David J. Myers, 8700 E. Mountain View, Unit 1082, Scottsdale, Ariz. 85258

[21] Appl. No.: 811,772

[22] Filed: Dec. 20, 1991

[51] Int. Cl.[6] .................................................. H04B 14/04
[52] U.S. Cl. ........................ 375/242; 375/377; 371/37.1
[58] Field of Search ................................ 375/19, 25, 122; 370/105.4; 341/58, 59; 371/37.1, 56; 358/261.1, 261.2, 261.3

[56] References Cited

U.S. PATENT DOCUMENTS

| | | |
|---|---|---|
| 3,995,264 | 11/1976 | Ouchi . |
| 4,261,019 | 4/1981 | McClelland . |
| 4,348,659 | 9/1982 | Fujimori et al. . |
| 4,387,364 | 6/1983 | Shirota ................................. 375/19 |
| 4,394,641 | 7/1983 | Artigalas . |
| 4,486,739 | 12/1984 | Franaszek et al. . |
| 4,501,000 | 2/1985 | Immink . |
| 4,509,164 | 4/1985 | Mouftah . |
| 4,517,552 | 5/1985 | Shirota et al. ..................... 341/106 |
| 4,530,088 | 7/1985 | Hamstra et al. . |
| 4,569,050 | 2/1986 | Ohme ................................. 371/37.1 |
| 4,598,326 | 7/1986 | Leiner . |
| 4,626,826 | 12/1986 | Fukuda et al. . |
| 4,675,650 | 6/1987 | Coppersmith et al. . |
| 4,677,421 | 6/1987 | Taniyama . |
| 4,750,138 | 6/1988 | Schouhamer Immink . |
| 4,760,378 | 7/1988 | Iketani et al. . |
| 4,811,361 | 3/1989 | Bacou et al. . |
| 4,827,475 | 5/1989 | Grover et al. . |
| 4,864,303 | 9/1989 | Ofek ........................................... 341/58 |
| 4,881,076 | 11/1989 | Ashley et al. . |
| 4,924,463 | 5/1990 | Thomas et al. . |
| 4,969,146 | 11/1990 | Twitty et al. . |
| 5,016,258 | 5/1991 | Tanaka et al. . |
| 5,025,256 | 6/1991 | Stevens . |

Primary Examiner—Stephen Chin
Assistant Examiner—T. Ghebretinsae
Attorney, Agent, or Firm—Robert B. Leonard

[57] ABSTRACT

An apparatus and method for transmission of data. A four bit data word is converted into an eight bit code word having a run-length of (0,1) which includes four binary ones and four binary zeros is defined where the start and end bits comprise a 01 or 10 pair to ensure the (1,0) run-length across word boundaries. A hashing code is used to generate the code words and decode received code words.

47 Claims, 11 Drawing Sheets

DATA WORDS

| DEC | HEX | BIN |
|-----|-----|------|
| 0 | 0 | 0000 |
| 1 | 1 | 0001 |
| 2 | 2 | 0010 |
| 3 | 3 | 0011 |
| 4 | 4 | 0100 |
| 5 | 5 | 0101 |
| 6 | 6 | 0110 |
| 7 | 7 | 0111 |
| 8 | 8 | 1000 |
| 9 | 9 | 1001 |
| 10 | A | 1010 |
| 11 | B | 1011 |
| 12 | C | 1100 |
| 13 | D | 1101 |
| 14 | E | 1110 |
| 15 | F | 1111 |

CODE WORDS

| DEC | HEX | BIN |
|-----|-----|------|
| 90 | 5A | 01011010 |
| 154 | 9A | 10011010 |
| 86 | 56 | 01010110 |
| 150 | 96 | 10010110 |
| 106 | 6A | 01101010 |
| 170 | AA | 10101010 |
| 102 | 66 | 01100110 |
| 166 | A6 | 10100110 |
| 89 | 59 | 01011001 |
| 153 | 99 | 10011001 |
| 85 | 55 | 01010101 |
| 149 | 95 | 10010101 |
| 105 | 69 | 01101001 |
| 169 | A9 | 10101001 |
| 101 | 65 | 01100101 |
| 165 | A5 | 10100101 |

CONTROL WORDS

| | | | DEC | HEX | BIN |
|---|---|---|-----|-----|------|
| S | S | S | 180 | B4 | 10110100 |
| T | T | T | 201 | C9 | 11001001 |
| E | E | E | 77 | 4D | 01001101 |

*Fig.1*

| DATA WORDS | | | REFERENCE WORD | | |
|---|---|---|---|---|---|
| DEC | HEX | BIN | DEC | HEX | BIN |
| 0 | 0 | 0000 | 90 | 5A | 01011010 |
| 1 | 1 | 0001 | 89 | 59 | 01011001 |
| 2 | 2 | 0010 | 106 | 6A | 01101010 |
| 3 | 3 | 0011 | 105 | 69 | 01101001 |
| 4 | 4 | 0100 | 86 | 56 | 01010110 |
| 5 | 5 | 0101 | 85 | 55 | 01010101 |
| 6 | 6 | 0110 | 102 | 66 | 01100110 |
| 7 | 7 | 0111 | 101 | 65 | 01100101 |
| 8 | 8 | 1000 | 154 | 9A | 10011010 |
| 9 | 9 | 1001 | 153 | 99 | 10011001 |
| 10 | A | 1010 | 170 | AA | 10101010 |
| 11 | B | 1011 | 169 | A9 | 10101001 |
| 12 | C | 1100 | 150 | 96 | 10010110 |
| 13 | D | 1101 | 149 | 95 | 10010101 |
| 14 | E | 1110 | 166 | A6 | 10100110 |
| 15 | F | 1111 | 165 | A5 | 10100101 |

*Fig. 7*

DC BALANCED 4B/8B BINARY BLOCK CODE FOR DIGITAL DATA COMMUNICATIONS

BACKGROUND OF THE INVENTION

1. Field of the Invention

This invention relates generally to data transmission codes for use in data communication systems and, more specifically, to a data transmission code, a method for encoding and decoding data into such a code, and a method of transmitting and receiving such a code for serial data communication. In particular, this invention relates to a data transmission code for use in serial, digital, data communications, having predetermined desired transmission characteristics, such as DC balance, run-length limit, error detection capabilities, and which is capable of being implemented in an AC coupled or DC coupled communication system in a cost-efficient manner by making new use of commercially available communications hardware, such as a Universal Asynchronous Receiver/Transmitter (UART).

2. Related Art

Digital data communication can be accomplished in many different ways using various combinations of hardware and software elements. For instance, such digital data may be transmitted as individual bits or, as is very often the case, as multi-bit data words. Such data words may also be encoded. An example of encoding would be the transformation of a four-bit data word into an encoded eight-bit word. Each of the methods of transmission mentioned has certain advantages and disadvantages, and the use of a particular form depends upon the requirements of the system in which it is to be utilized.

Likewise, a variety of hardware elements may be utilized to send and receive digital data communications, the exact nature of which are determined by the method, such as those described above, by which digital data which is to be sent or received, and the overall requirements of the system or systems which are utilizing the digital data communications. For instance, custom transmitters/receivers can be utilized if the associated systems which incorporate them can bear the costs associated with the development and production of custom hardware or, in the alternative, standard commercial devices such as UART's can also be utilized. Of course, these devices, and others which could be referenced, each have their associated advantages and disadvantages, depending on the application of interest.

The critical concern in designing a digital data communications system is finding a combination of the hardware and software elements mentioned above which meet the requirements of the system in which it is to be utilized. Meeting such requirements requires balancing of many factors, several of which include, the cost of the elements used to construct the system, error detection capability, transmission efficiency, including the efficiency of an encoding method if one is utilized, memory or other hardware components necessary to facilitate transmitting and receiving of digital data (e.g., to contain encoding/decoding algorithms), and other hardware or software characteristics which are associated with the overall system, such as whether AC coupling, DC coupling, or both, are to be utilized with the transmission media. It has been recognized that particular applications, such as a digital data communication system which could be utilized within a home to integrate the control of certain systems located within the home, as described in co-pending application "A System and Method for Automating the Control of a Space", by W. M. Wald, et al U.S. patent application Ser. No. 07/811,508, could be implemented, but would require a particular combination of hardware and software elements as described above. The functional requirements for this combination included the use of encoded data words, good error detection capabilities, the use of low cost, commercially available components, and the ability of the data communication system to accommodate DC coupling or AC coupling, and other application specific factors.

The present invention is a new combination of hardware and software elements, including an encoding method for creating a set of 8-bit code words from 4-bit data words which meets the criteria noted. This code can be transmitted and received through the use of standard UART's. The following is a discussion of art related to encoding of digital data, and the hardware which has been utilized to transmit and receive the encoded data.

With respect to encoding, one encoding method is known as non-return-to-zero (NRZ) encoding, and it is commonly used in serial data transmission systems. In one common use of this encoding method, a binary "1" value is represented as a positive voltage, and a binary "0" value is represented as a negative voltage and thus, strings of positive and negative voltage signals can be used to represent code words. Codes generated using this method are popular due to the fact that they are simple to encode and decode; however, a number of undesirable characteristics associated with typical NRZ generated codes make this type of encoding method unsuitable for many applications.

For example, standard NRZ encoding methods make no provisions for limiting the ratio of binary "1"s to binary "0"s sent over the transmission medium. In the case where a binary "1" is represented by a positive voltage, and a binary "0" is represented by a negative voltage, a long string of like digits (e.g., like voltages) can impose additional requirements on the overall digital data communications system. This occurs because, in instances where the data must be transmitted over a relatively long distance, the transmission medium, if it is a wire, has a certain capacitance and inductance. The transmission of a long string of like digits, either binary "1"s or "0"s, can effectively charge the transmission line. The result is that when the time comes to transmit a different digit, a higher power transmitter is required to effect the change in voltage on the transmission line necessary to produce the change of the digit. In the case where AC coupling is used with NRZ codes, such as to avoid ground loop problems in the transmission medium, NRZ coding does not work effectively. This is due to the fact that the AC coupling network is usually a high pass filter. Therefore, if a transmitted signal has a large "1"/"0" imbalance, and thus a large DC or low frequency component, this component will get filtered out, resulting in a distortion of the signal and a loss of information. Therefore, in certain applications, a DC balanced code is desirable, which occurs when an equal number of binary "1"s and "0"s are transmitted, however, NRZ encoding methods do not provide DC balanced codes.

Another often desired feature in data transmission systems which is not provided for in NRZ encoding methods is a run-length limit, which is the number of consecutive identical binary digits which may be found in a string of transmitted code words. The run-length limit is often represented as (d,k), where d is the minimum number, and k is the maximum number, of binary digits of the same value that may follow any given binary digit. To allow a code to be self-clocking and not require a separate clock signal the maximum number of consecutive binary digits must be minimized to increase the number of transitions in the signal. Although the feature of self-clocking generally requires a special clock-recovery circuit such as a phase-locked loop (PLL), it is generally preferred over having an additional transmission line connected to each device in the system. Similarly, a minimized run-length is at times desirable for the same reasons as the DC balance of the transmitted code is sometimes desirable. Longer strings of consecutive binary digits introduce lower frequency components to the transmitted signal, which can get filtered out in situations where AC coupling is used, and cause a distortion of the signal and a loss of information.

One type of encoding method which solves some of the above limitations associated with NRZ encoding methods is the Manchester encoding method and its variations. This type of encoding method represents binary values as signal transitions and produces a code which is guaranteed to have at least one transition per code word. This provides for a run-length limit of (0,1), which allows self-clocking with the addition of separate clock-recovery circuitry. It also provides for perfect DC balance. However, the Manchester encoding method is bit-oriented, which raises additional concerns. First, as most data transmission systems are byte-oriented, additional hardware or software is required to handle the conversion from a code generated under a bit-oriented encoding method to byte-oriented data words which the communicating devices can understand. This additional conversion, implemented in hardware or software, and coupled with clock-recovery hardware, has the effect of increasing the cost and complexity of such a system. Also, bit-oriented encoding methods are somewhat limited in the use of special control characters, as every code word maps directly to a data word. Control characters are often important in data communication networks to perform such tasks as identifying the beginning or end of a message, and the limitations with respect to control words can effect the efficiency of the system. Therefore, although the Manchester encoding method is sometimes desirable for use over the NRZ encoding methods, it still suffers from a number of limitations that decrease its desirability for use in certain data transmission systems.

Another alternate encoding method is group, or block, encoding. This encoding method maps a group of bits into a larger group, sacrificing some efficiency for enhanced features, including the use of control symbols, by choosing only those code words from the larger group that meet predetermined specifications. However, the system requirements and encoding efficiency of such codes often limit the number of code symbols that meet the predetermined communication requirements, so a compromise must be reached between system requirements, encoding efficiency and providing optimal transmission characteristics when using such codes.

Another feature which is often important to data transmission systems and can be accommodated by group codes, is error-detection. This advantage is demonstrated by the minimum Hamming distance of a code, where the Hamming distance is defined to be the number of variant bits between two code words in an encoding method. As the number of different bits between code words increases, so, too, does the probability that an error will be detected.

Rather than error-detection, though, much of the related art in this area has concentrated on methods of providing for DC balance. This may be due to the fact that in many systems, the additional memory required for error-detection is available, but in systems where cost is an important criteria, such memory is often not available. Nevertheless, related art may be classified into encoding methods providing inherent DC balance, encoding methods implementing alternate code words, and encoding methods providing separation bits between code words.

The inherently DC balanced encoding methods provide DC balancing through only selecting code words which have an equal number of "1"s and "0"s. Their main drawback is that efficiency of the code, in addition to such features as run-length limit and Hamming distance, usually are compromised to allow a sufficient number of DC balanced code words to be used. One example of such an encoding method is found in U.S. Pat. No. 4,924,463 of Thomas et al., which in one embodiment provides a 4B/6B (4-bit data word to 6-bit code word) code where all of the code words contain three binary "1"s and three binary "0"s to provide inherent DC balance. However, due to the limited number of code words which meet this limitation, the run-length limit for this encoding method is only (0,3), which can introduce lower frequency components into the transmitted signal, and consequently increase the requirements and cost of providing AC coupling.

The alternate code word method of encoding attempts to provide for DC balance and yet retain much of the other desired features of a good transmission code. Such a method involves selecting a first group of code words which meet the constraints of the predetermined characteristics such as run-length limit, etc. From this group, a second group of code words which have no DC component are then selected, and since the number of code words in this second group is usually less than the number of data words, two code words with opposite DC components are chosen for each of the remaining data words. During transmission, a running count of the DC component is stored, and when a data word mapped to alternate code words is encountered, the appropriate code word containing the DC component necessary to balance the system is utilized. Such a method is described in U.S. Pat. No. 4,811,361 of Bacou et al., where a generic m-to n-bit encoding method is disclosed. In its 8B/10B embodiment, data words are first mapped to code words containing five "1"s and five "0"s, with the remaining data words mapped to code words containing six "1"s and four "0"s. The complement of each of the unbalanced code words is used as the alternate word of opposite DC component. The disadvantage of this code, and those like it, is that additional hardware and processing time is required to generate the correct code word, which adds complexity and cost to the system.

Finally, encoding methods which employ separation bits between code words provide another method of obtaining a code with the desirable qualities noted above. A typical method of this type is described in U.S. Pat. No. 4,501,000 of Immink et al., where m-bit data words are encoded into $n_1$-bit code words, with $n_2$-bit separation blocks between code words to correct for run-length limit and DC imbalances. The major disadvantage to this type of encoding method is similar to the alternate code word method, in that the additional hardware and decision logic required to implement the method adds cost to the unit, and lowers the efficiency of the system.

Thus, with respect to group coding, the different methods of providing DC balance while retaining efficiency and optimal transmission characteristics tend to require greater or lesser amounts of hardware devoted to the generation of the code in order to give certain desirable features. With respect to the cost of such systems, such additional circuitry is undesirable; however, there are additional concerns with these methods. In addition to the hardware and decision processing that is required to implement DC balance in many of the above codes, additional custom hardware may be required to allow codes not based upon standard-sized groupings (4-, 8-, 16-bit words, etc.) to be implemented in a communication system. Most commercially available communication hardware is designed to work with standard quantities (4, 8, 16, bits, etc.), so conversion circuitry is required to allow the communication device to handle code words which are not based upon the standard-sized groupings.

A final concern with group encoding methods is the difficulty of the corresponding decoding method. Unlike the bit-oriented decoding methods, which simply must convert each code word transmitted over the system to its equivalent binary logic value, group decoding methods can be much more complex. For example, in a 4B/8B encoding method, the encoded words can include 256 possible values and must to decoded to one of 16 data values plus control characters. This requires the use of a look-up table or decoding algorithm, which may add additional hardware or software requirements, or both, to the digital data transmission system.

Therefore, although group encoding methods solve many of the problems associated with NRZ, Manchester, and other related encoding methods, they suffer from a number of problems that limit their desirability. The foremost problems associated with group encoding methods are the amount of additional hardware and processing that is required for their implementation and their inability to meet optimal data transmission characteristics such as perfect DC balance and minimum run-length limit. The addition of hardware or software, or both, to perform code conversion, generate code words, provide a clocking signal, and decode transmitted code words, can add cost and complexity to communication systems in which such codes are utilized. In some applications, the cost added to a system to perform these functions is not a limiting factor, and therefore these additional costs are acceptable. However, in some applications, such as the application described herein, even small costs are important, and codes, methods of generating such codes, and methods of transmitting and receiving such codes which tend to minimize additional hardware and software requirements, are needed.

SUMMARY OF THE INVENTION

Accordingly, it is an object of this invention to provide a data transmission code, a method of encoding and decoding such a data transmission code, and a method of transmitting and receiving such a data transmission code, which may be used in a digital data communication system, and which can be implemented inexpensively using standard commercial hardware such as a UART.

In accordance with the present invention, a method of encoding four-bit data words into eight-bit code words, and a complementary decoding method for converting the code words back to data words, is disclosed. Each code word generated by the encoding method has four binary "1"s and four binary "0"s to provide for inherent DC balance, and transmitted signals containing strings of these code words has a run-length limit of (0,1).

The Hamming distance between all of the code words and control words is at least two to guarantee the detection of all single bit errors. Also, all 3, 5 or 7-bit errors can be detected, as well as approximately 86% of 2-bit errors and a majority of 4-bit and 6-bit errors.

Additionally, the corresponding decoding method may be implemented using a hashing algorithm, which reduces the amount of hardware, including memory space, required to regenerate a data word from its corresponding code word.

An advantage of this method of encoding and decoding is that data may be transmitted simply and inexpensively due to the steps taken to reduce the processing time and hardware required to implement the system. First, as it is inherently DC balanced, the code can be used in either an AC coupled transmission system, or a DC coupled transmission system. Also, the run-length limit further reduces the requirements when used in an AC coupled system, as the lowest frequency component of the signal will be one-half the clock frequency. Additionally, the hashing algorithm implemented by the decoding method may be accomplished in a few processing steps, and without the use of a look-up table, thereby reducing requirements for memory space. Finally, as it is an 4B/8B code, the need for buffers or conversion hardware to convert the code into a byte-oriented form for subsequent processing is eliminated.

Additionally, in one embodiment of the invention, a further significant advantage of this method of encoding and decoding is obtained. The embodiment of the method in a 4B/8B encoder/decoder allows the use of this block or group code directly with commercially available communications hardware, including a UART, or a microcontroller which incorporates such a device. This is significant since such devices are typically designed only for use with 7- or 8-bit code words. Use of a UART has the further advantage of permitting reliable clock-recovery without the need for any additional clock-recovery hardware.

BRIEF DESCRIPTION OF THE DRAWINGS

FIG. 1 is a code word table showing one possible set of code words used in the present invention to map four bit binary words to eight bit binary code words.

FIG. 7 is a decoder look-up table for the code of FIG. 1.

DETAILED DESCRIPTION OF THE PREFERRED EMBODIMENT

Figure 2:
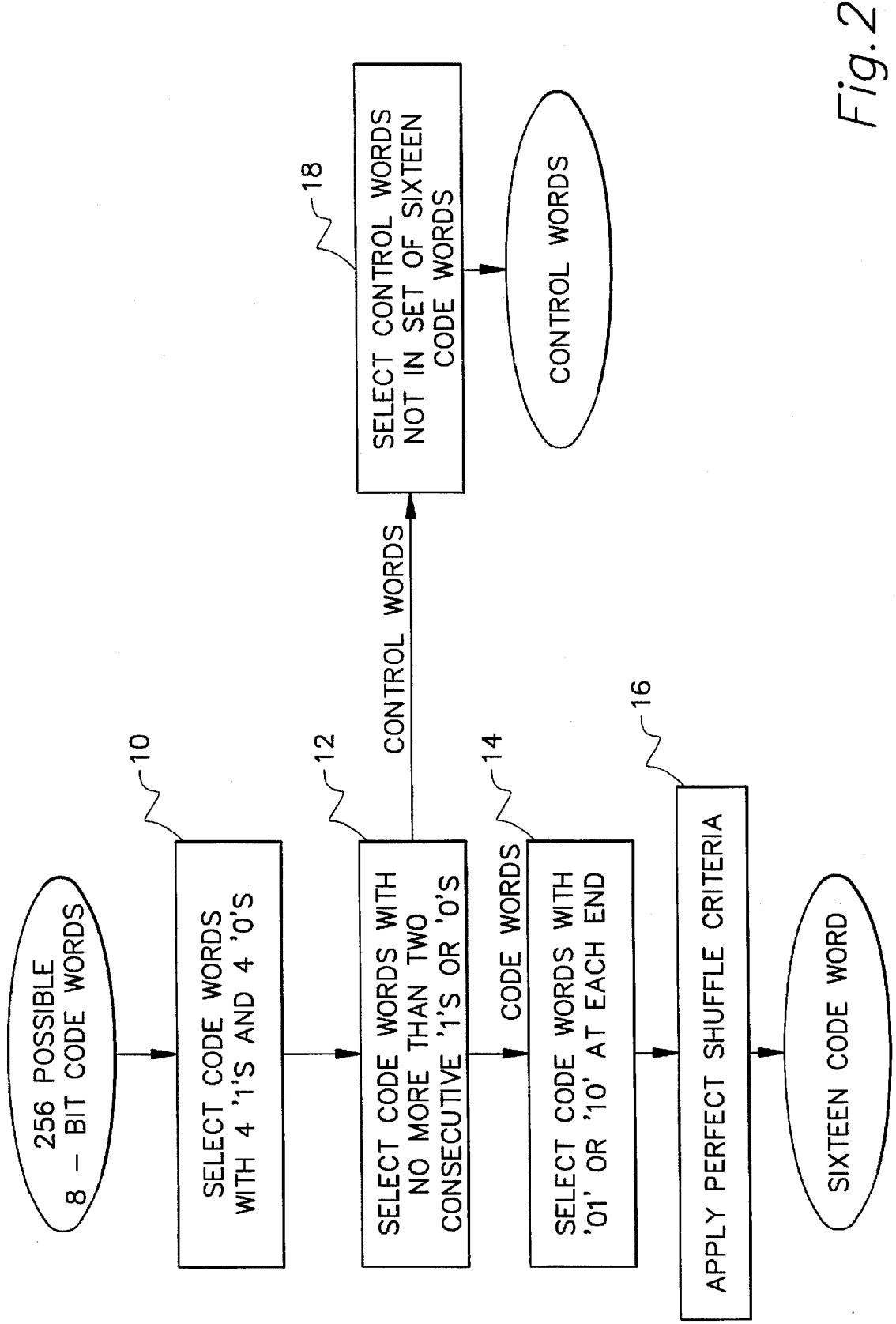
FIG. 2 is a block diagram of a method of selecting code words for a code implementing a 4B/8B encoding method.

The invention disclosed herein is concerned with a 4B/8B code and encoding method for transmitting binary information in a serial digital data communications system. In a system implementing such an encoding method, each of sixteen different four-bit data words must have a corresponding eight-bit code word. FIG. 1 shows a code word table for a code usable with a 4B/8B encoding method. Each of the code words in FIG. 1 has certain bit relationships with respect to other bits within a given word, and with respect to certain bits in each of the other code words. The sets of words having these bit relationships provide a code, or set of code words, with desirable transmission characteristics. The bit relationships are further described herein.

Firstly, each code word is inherently DC balanced in that each has four binary "1"s and four binary "0"s. This code is preferably implemented where logic "1" values may be represented by a positive voltage, and logic "0" values are represented by a negative or zero voltage, transmitted along on a transmission line which is usually a wire or wires, however, other types of transmission media may be utilized. This feature prevents a charge, and resulting capacitance or inductance, from building up on long transmission lines due to transmission of more bits having one value, such as a "1", than those having the other binary value, such as a "0". DC balance permits the use of driver circuits which have lower capacity to source or sink a current, which usually has a direct effect on system cost. Also, a DC balanced code permits use of AC coupling, which can be important when considering longer transmission lines, particularly wire transmission lines, because of the potential for the development of ground loops in DC coupled systems.

Secondly, each code word has a (0,1) run-length limit as there are no more than two consecutive binary "1"s or "0"s within a code word. Each code word also begins and ends with either a "01" or "10" bit grouping, to also provide for a (0,1) run-length limit across word boundaries. Together these bit relationships assure that a transmission of multiple code words will have a (0,1) run-length limit, regardless of how many and which combination of code words are actually transmitted. This feature limits the energy distribution of the transmitted signal into a minimum frequency band, which is narrower than codes having a longer run-length limit such as (0,3). Minimizing the frequency band requires lower cost hardware to process a signal when it is transmitted or received. Also, the run-length limit permits the code to be used effectively in systems where the transmission lines are AC coupled. A broader distribution of energy in the frequency band, such as results from a longer run-length limit, makes it difficult to implement AC coupling without the use of higher cost hardware to prevent the loss of the lower frequency components of the transmission. Finally, this run-length limit permits the code to also be used for a clocking function in applications where a code-based clocking function is desired or required.

Thirdly, each code word also has a Hamming distance, the definition of which is known to those of ordinary skill in the art, of two with respect to every other word in the code. This allows for improved error-detection capabilities for a system implementing the code, including the detection of all odd-bit errors (e.g., 1, 3, 5 and 7), and a significant percentage of 2-bit errors, on the order of approximately 86%. The majority of 4 and 6 bit errors can also be detected when utilizing the present invention. This error detection capability is an advantage over previous codes with respect to the number of types of errors which can be detected. The error detection characteristics are also enhanced because of the expansion of the data word (4B) when creating the code word (8B), as compared with lesser expansions of the data word (e.g., 8B/10B), where 8B represents the size of the data word, and 10B is the size of the encoded word, because more bits are available for error detection.

The code words of the present invention are 8-bits in length such that they can be transmitted and received using a standard UART. Typical group or block codes result in code word lengths which are not 7 or 8-bits in length, and therefore require the use of custom transmission and receiving hardware, which increases the cost of the overall data communication hardware.

An 8-bit code with the bit relationships explained above for use in a data transmission system may be generated by means of a selection method as described in FIG. 2. For a 4B/8B encoding method, the number of possible code words is 256; however, only sixteen need be selected from this group of possible code words to represent the sixteen data words.

The first step 10 in this selection method is to select a first subset containing all of the code words from the 256 possibilities which have exactly four "1"s and four "0"s, to ensure inherent DC balance. From this subset, a second step 12 is to select a second subset containing the code words having no more than two consecutive "1"s or "0"s is selected. The third step 14 is to select a third subset of code words, from the second subset, that begin and end with either a "01" or "10" bit grouping. The fourth step 16 is to select a fourth subset by dividing each 8-bit word from the third subset into an upper and lower nibble, each having a unique hexadecimal representation, and selecting those code words whose upper and lower nibbles represent a perfect shuffle. A perfect shuffle is defined to be those sixteen code words representing all possible combinations of four hexadecimal numbers taken two at a time. In FIG. 1, the perfect shuffle represents all possible combinations of the hexadecimal numbers 5, 6, 9 and A.

In addition to code words, the data transmission system may also utilize a set of control words in the code to perform system related tasks, such as delimiting the start and end of a data transmission stream. Control words, in order to be compatible with a code implementing a 4B/8B encoding method, must have essentially the same characteristics as code words; however, due to constraints on the number of words meeting all of the above characteristics, the control words selected for the code do not meet all of the characteristics of the code words.

Like code words, the eight-bit control words have four binary "1"s and four binary "0"s, such that they are inherently DC balanced. They also are limited to having no more than two consecutive binary "1"s and binary "0"s, such that the run-length limit within each control word of (0,1). Due to the fact that control words typically are found at the beginning and end of a data stream and occur less frequently, however, there is no requirement that each control word start and end with a "01" or "10" bit grouping. A (0,1) run-length limit across boundaries may be provided for instead by selecting control words based upon where in a data transmission they will always occur. For example, a control word that delimits the start of a data transmission could begin with a "11" bit grouping since no other word is transmitted before it, and thus no possibility exists for a preceding word to end in "1".

The control words for the data transmission system may be selected as shown in block 18 from those words resulting from selecting the second subset 12 in the code generating method described above (i.e. the set of code words with four binary "1"s and four binary "0"s, and with no more than two consecutive "1"s or "0"s) that were not selected as code words. For a data transmission system utilizing a 4B/8B encoding method, eighteen words are available for use as control words after sixteen code words are selected from thirty four possible words in the second subset.

The code of FIG. 1 includes three control words with representation: S, T and E. S and T are the first and second start delimiting control words. They are transmitted sequentially immediately prior to the data stream of code words in order to indicate the start of a data transmission. E is the end delimiting control word that is transmitted twice immediately after the data stream to indicate the end of a data transmission.

Another possible addition to a data transmission system's code is a specialized decoding method. If memory is not a concern with a system, then code words may be mapped to data words in any manner, and these code words can be decoded by the system through the use of a look-up table. These tables, however, are undesirable for use in a system where available program memory is limited (e.g., low cost applications). This is because in order to decode an eight-bit code word into a four-bit data word, a look-up table with 256 entries is required to decode only sixteen data words, essentially wasting 240 bytes of memory space.

Similarly, if decoding efficiency and program memory space are not concerns, then code words may be mapped to data words in any manner, and a series of sixteen comparisons, such as IF-THEN-ELSE comparisons as known to those skilled in the art, may be used for the decoding method. This, however, is an inefficient method of decoding because, as in the code of FIG. 1, between one and sixteen comparisons would always be required to decode each of the code words.

To best strike a balance between decoding efficiency and memory space, more elaborate decoding methods are required. One consequence of this is that code words must be mapped to data words in a specific manner to take advantage of these decoding methods.

Figure 3:
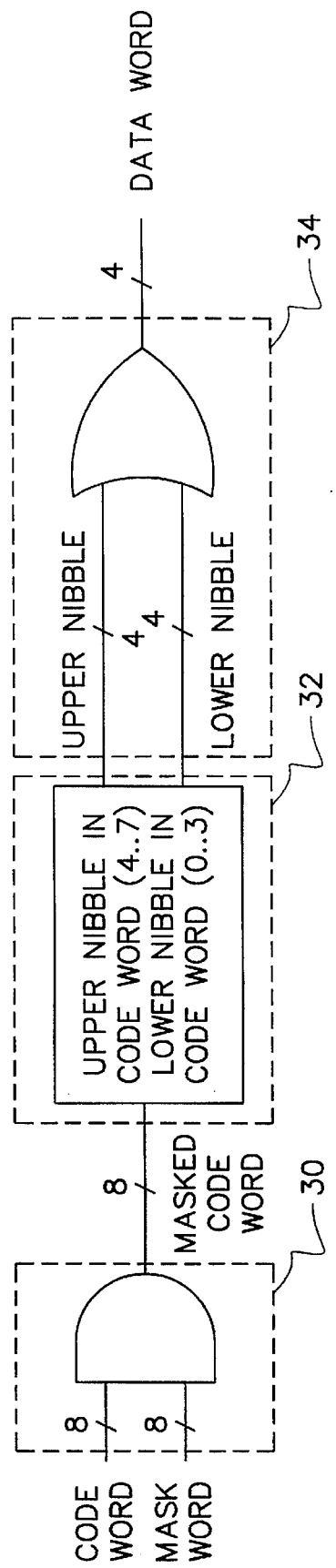
FIG. 3 is a block diagram of a method of mapping an eight-bit code word to a four-bit data word.

One such method of mapping is illustrated in FIG. 3. It is implemented using a hashing algorithm. In order to map a code word to a corresponding data word, the first step 30 is to mask off the code word by ANDing it with an eight-bit mask word, to create a masked code word. A proper mask word is split into two four-bit strings. The upper string, made up of the four most significant bits in the mask word, contains between one and three binary ones in any position, and the lower string, made up of the four least significant bits in the mask word, is the ones-complement of the upper string (i.e. each bit is the complement of the corresponding bit in the upper string). For example, the mask word used in the code of FIG. 1 is 10100101.

The second step 32 in the mapping is to break the masked code word up into an upper nibble, made up of the four most significant bits, and a lower nibble, made up of the four least significant bits. The third step 34 is to OR the upper and lower nibbles together to get the corresponding data word.

As an alternative mapping method, the third step 34 of the above method may be substituted for a second third step 36, where ORing the upper and lower nibbles together results in the reverse of the corresponding data word (The reverse of a word simply means its mirror image, e.g. the reverse of "wxyz" is "zyxw"). This is shown by the substitution of second third step 36 to FIG. 3a in place of the third step 34 in FIG. 3. This method may be preferred in the alternative should the code be implemented in a system which uses a universal asynchronous receiver/transmitter (UART), as such a device transmits words in reverse order. Thus, a double reversal will occur if this method is used. By mapping a code word to the reverse of the desired data word, the correct data word will be decoded when the UART reverses the code word for transmission. For the code of FIG. 1, this alternative mapping is used, because the code is implemented using such a UART.

Figure 3A:
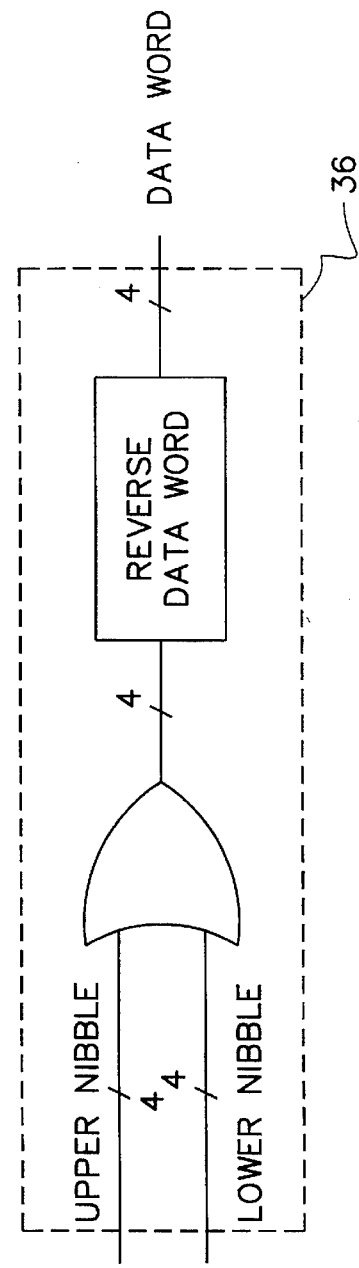
FIG. 3a is a modification of FIG. 3, illustrating the use of a UART.

As an example of the mapping method of FIG. 3, incorporating the reversal in FIG. 3a, a sample mapping for the code word corresponding to the data word 0011 (3) of the code in FIG. 1 may be performed. This code is designed as if to be implemented in a system using a UART, and thus the result of the mapping method is the reverse of the corresponding data word. First, by ANDing the code word, 10010110, with the mask word, 10100101, a masked code word, 10000100, is obtained. Next, this is split into an upper nibble, 1000, and a lower nibble, 0100. Finally, when ORing the upper and lower nibbles together, this results in the value of 1100. Reversing this value gives 0011 (3), which is the proper data word to be mapped to the code word.

Figure 4:
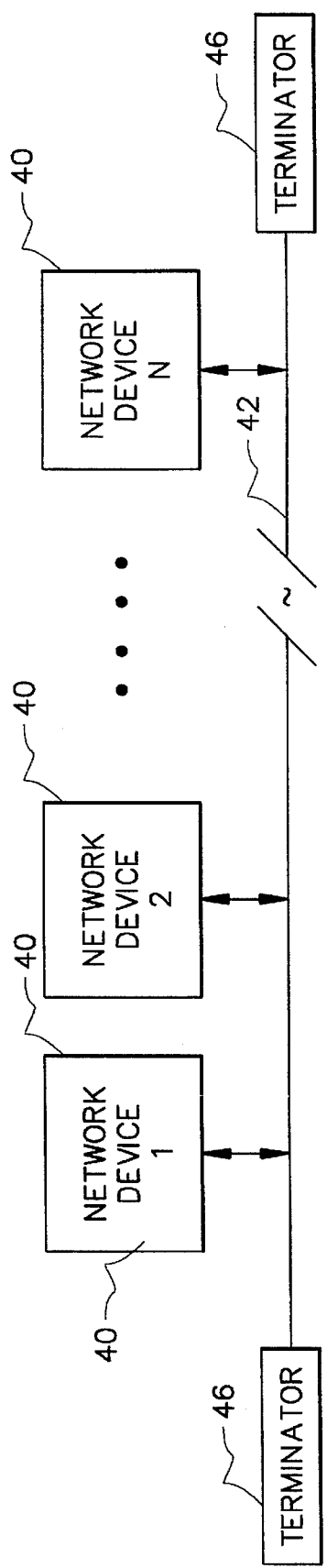
FIG. 4 is a data transmission network utilizing a 4B/8B encoding method.

The code described herein is useful in a number of different data transmission systems. One such system is illustrated in FIG. 4. This system is a network comprised of a plurality of network devices 40 connected to each other via a common transmission media or bus 42. There is a central control device 44 controlling the network, such that each network device 40 on the network has the ability to operate and communicate independently from any other network device 40, and yet be operated by central control device 44 in a coordinated way. In this interconnection configuration, each network device is simply a node in a long chain terminated on each end, if need be, by passive termination circuits 46, so any message transmitted by one network device is received by every other network device.

One use of such a data transmission system is in an automation system which can be used in a building, as described in co-pending application, "A System and Method for Automating the Control of a Space", by W. M. Wald, U.S. patent application Ser. No. 07/811,508 which is hereby incorporated by reference. In such a case, the network devices could be thermostats, HVAC controllers, security systems, lighting controllers, etc. Use of the data transmission system would allow the different devices to communicate with one another to allow for the integration and coordination of the function of the different systems. For instance, a security system, HVAC and lighting control system could be integrated to allow the operation of the security system to operate the HVAC controls, and turn lights and other electrical devices on and off at different intervals, such as to create a "lived in look".

Figure 5:
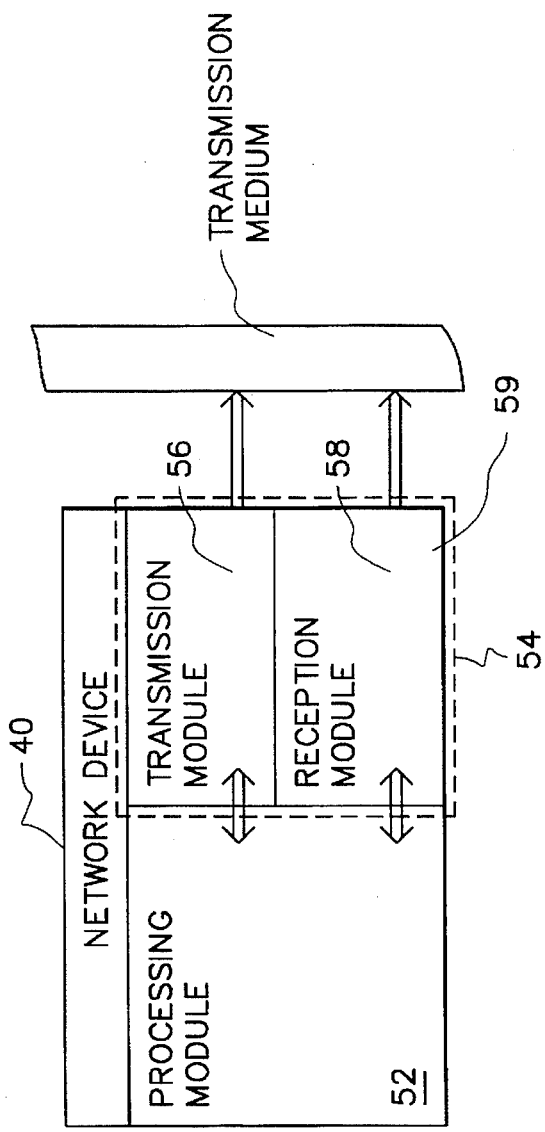
FIG. 5 is a functional block diagram of a network device implemented in the network of FIG. 4.

Functionally, each network device 40 may be represented as in FIG. 5. Network device 40 includes processing module 52, such as a microprocessor or microcontroller, which performs the primary functions of network device 40, e.g., monitoring various alarm points in the home in the case of a security system. Processing module 52 also has the ability to transmit data to, or receive data from, other devices connected on the network, as described herein and illustrated in FIG. 4. The actual transmitting and receiving functions, however, are carried out in transceiver module 54, which may comprise a separate transmitter 56 and receiver 58, or a unitary transceiver 59.

Transceiver module 54 of network device 40 receives a code word or plurality of code words from processing module 52 and transmits it over the network to other network devices and, conversely, receives a code word or plurality of code words from other network devices 40 and delivers it to processing module 52. It can be controlled by a transmission processor independent of processing module 52 of the network device, or controlled as a transmission processing subsystem of processing module 52. An example of a transceiver would be an RS485 driver circuit, such as are known to those of ordinary skill in the art, but any drive circuit capable of transmitting and receiving code words may be utilized.

In the transmit mode, transceiver module 54 operates by first receiving a code word from the processing module. Then, each word of data is transmitted across the transmission medium. The encoding may be implemented by a look-up table, with an entry of the code word in the code described above for each data word.

Transceiver module 54 may also transmit control words along with a code word, or plurality of code words, to provide for certain control functions. Typically, such control words are used at the beginning and end of a message, comprising a plurality of code words, to delimit its start and finish. A start delimiter control word, or plurality of code words, may be transmitted immediately prior to the transmission of a code word or words, such that other network devices 40 are alerted that data is forthcoming over the transmission medium. Similarly, an end delimiter control word, or plurality of code words, may be transmitted immediately after the transmission of a code word or words, such that other network devices 40 know that they have received a complete transmission. For the code of FIG. 1, each transmission of a cord word or words from a network device is preceded by S and T, the first and second start delimiter control words, and is followed by two Es, the end delimiter control word.

Transceiver module 54 operates to receive over the network a code word, or plurality of code words, sent by another network device 40 and make this code word, or words, available to processing module 52. It can be controlled by its own reception processor, independent of processing module 52 of network device 40, or controlled as a reception processing subsystem of processing module 52 itself. Data received over transmission medium may be broken apart and decoded by the reception processor prior to providing it to processing module 52, or, alternatively, the code word or words may be sent directly to the processing module 52.

Transceiver module 54 operates by first receiving a code word, or words from the, transmission medium. Then, the code word or words are provided to the processing module for decoding and utilization of the data word or words provided.

Figure 6:
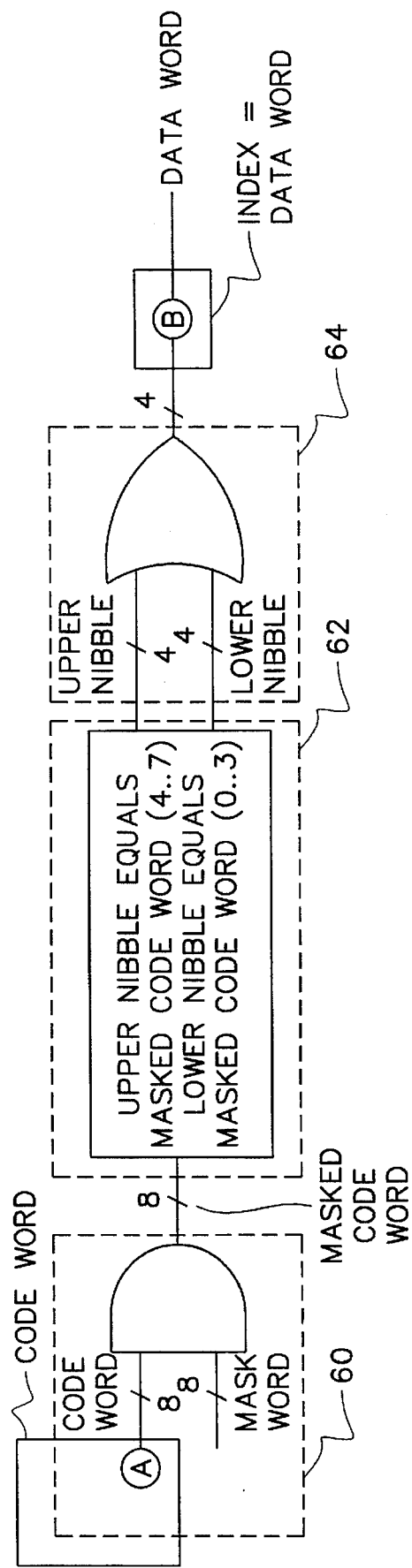
FIG. 6 is a block diagram of a method of decoding a four-bit data word from an eight-bit code word.

One efficient method of decoding, as shown in FIG. 6, takes advantage of the specific mapping of code words to data words using the hashing algorithm applied in the method as described herein and illustrated in FIGS. 3 and 3a.

The first step 60 of this hashing algorithm is to mask off the eight-bit code word by ANDing it with an eight-bit mask word used to generate the mapping scheme for the code, to create a masked code word. For the code of FIG. 1, the mask word used is 10100101.

The second step 62 of the hashing algorithm is to break the masked code word up into an upper nibble, made up of the four most significant bits, and a lower nibble, made up of the four least significant bits, as described herein. The third step 64 is to OR the upper and lower nibbles together to get an index value 66. This index value 66, barring any transmission errors, is equal to the data word corresponding to the received code word.

Figure 6B:
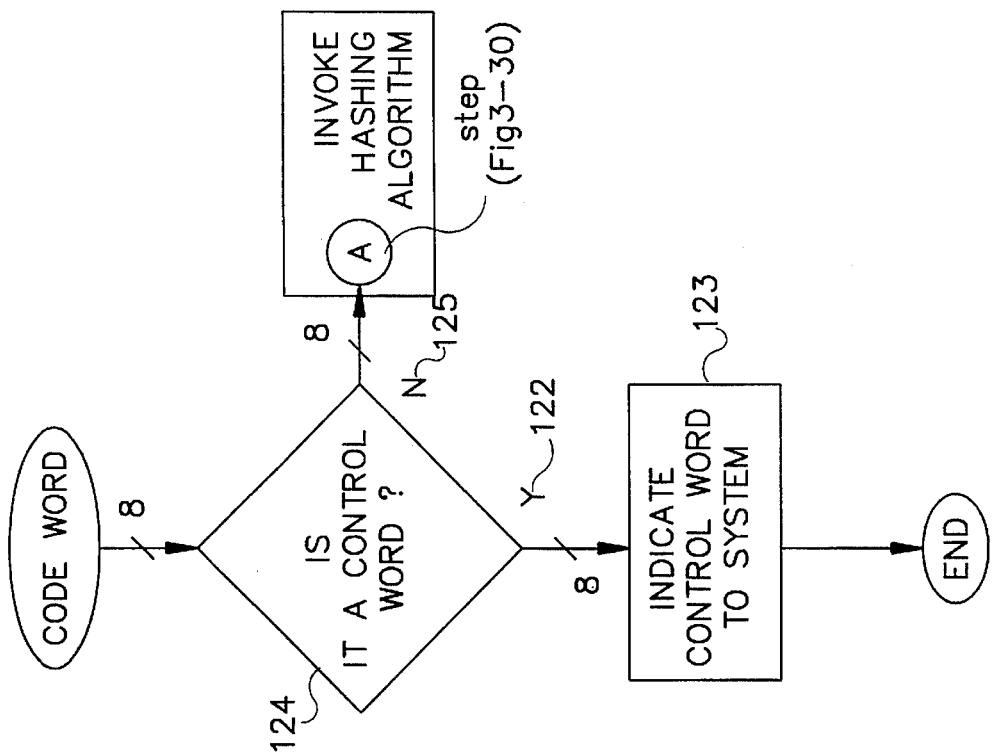
FIG. 6b is an addition to FIG. 6 to incorporate decoding control words.
Figure 6A:
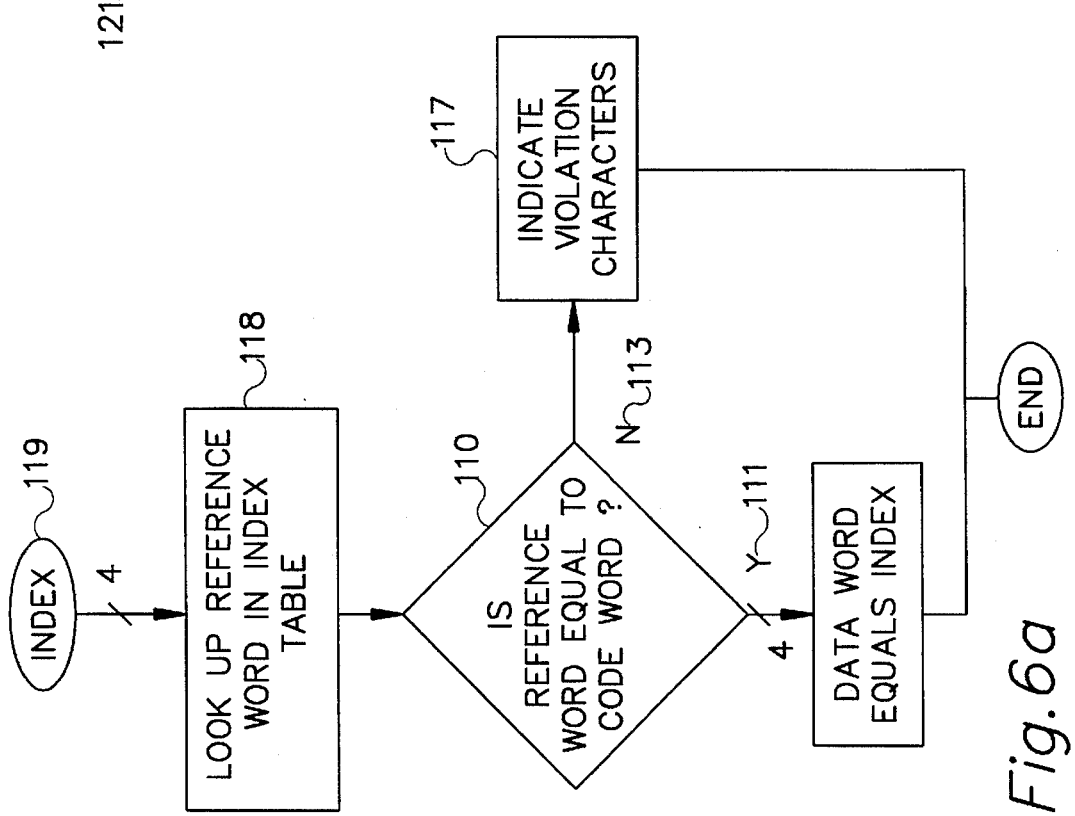
FIG. 6a is an addition to FIG. 6 to incorporate violation character checking.

To provide for error checking, the index value (119) may also be used as an index into a decoder look-up table (118), which is sixteen words in length, using the method illustrated in FIG. 6a. Such a table for use with the code in FIG. 1 is shown in FIG. 7. Each entry in the table contains a reference word corresponding to the proper code word corresponding to the data word decoded using the hashing algorithm of FIG. 6. The code word actually received is compared (110) to the reference word in the table at the entry indexed by the index value. If these values are the same (111), then a valid data word has been received error-free. If these values are different (113), then the decoder must indicate (117) that a violation character has been received and invoke any necessary error correction algorithms.

The encoder look-up table and the decoder look-up table will be identical in digital communication systems which transmit information across transmission medium in a most-significant bit to least-significant bit order. UART's, and microcontrollers implementing UART's, however, transmit information least-significant bit first. Therefore, to correct for this reversal, the code words in the encoder look-up table must be the reverse of the code words in the decoder look-up table. Correspondingly, the reference words in FIG. 7 are the reverse of the code words in FIG. 1.

If control words are also used, the decoding method must first incorporate a check (121) for these control words, such as by using comparison steps (124) prior to applying the hashing algorithm, as shown in FIG. 6b. If a control word is found (122), then the decoding method will allow for a signal to indicate (123) to processing module 52 that a control word was found, and will bypass the rest of the decoding method. If a control word is not found (125), then the decoding method will proceed with the use of the hashing algorithm.

For a code implementing a 4B/8B encoding method such as the code in FIG. 1, each network device 40 may be implemented simply and inexpensively using a UART for transceiver module 54, because such UART's can transmit and receive 7 or 8-bit quantities directly, without any additional processing. There are a number of advantages to using a commercially-available UART. First, the cost of a UART itself is minimal. Second, the use of a UART eliminates the need for additional clock recovery hardware, as the UART implements an internal lock-and-drift method, such as is known to those of ordinary skill in the art, of clock recovery. Alternatively, a microcontroller with an internal UART may be implemented in network device 40. A commercially-available microcontroller typically costs only a few dollars, and is able to integrate the transceiving functions with the local functions in a single device. In fact, as some form of processor or controller is required to operate a network device in the first place, it may be possible in some cases to add the communications capability for no significant additional hardware cost, if a microcontroller/UART combination is used. For a low-cost network device 40 such as a thermostat, for example, the availability of a microcontroller is especially important because a communications capability can be added without a significant change in cost.

Figure 8A:
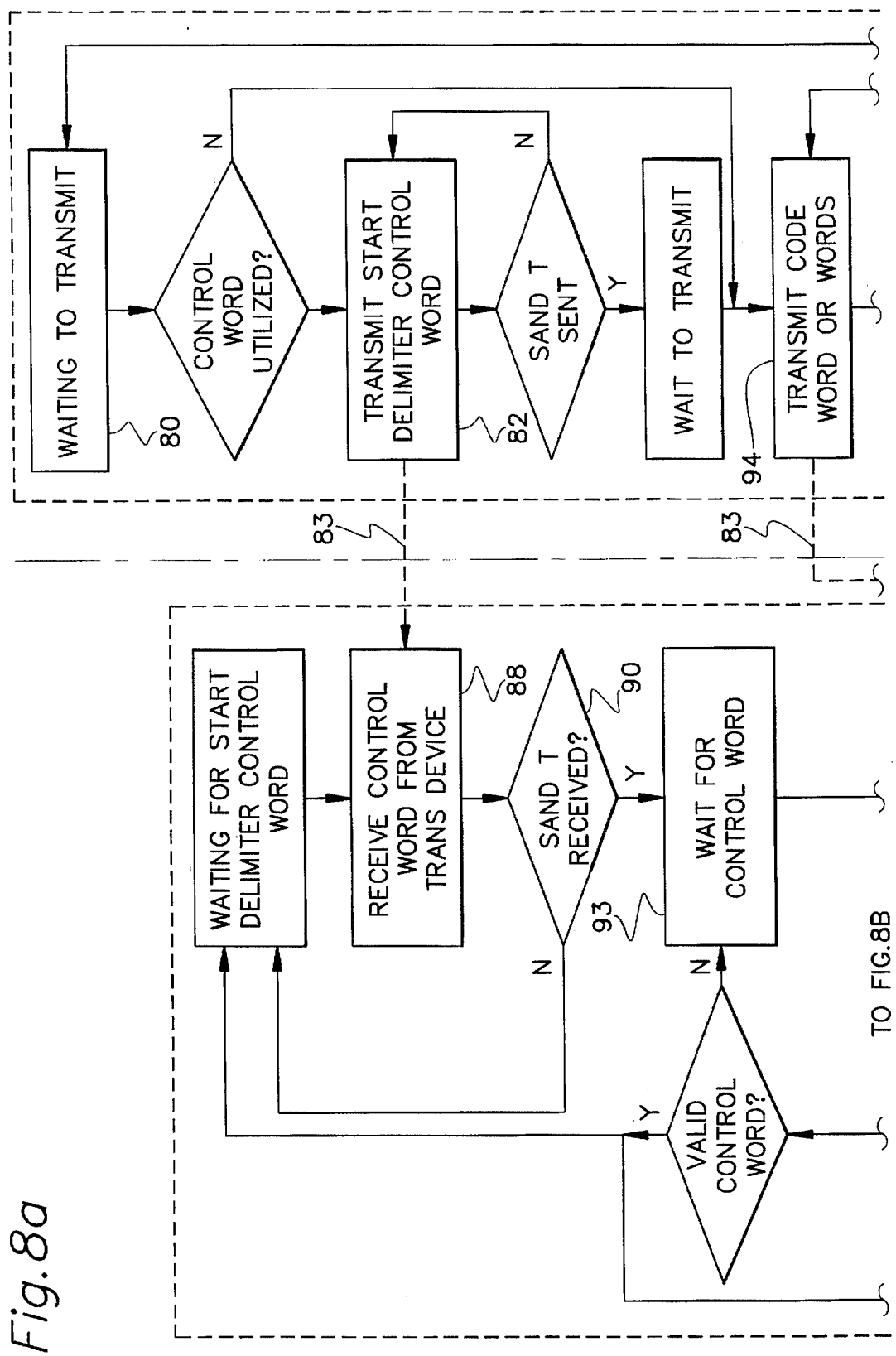
FIG. 8 is a block diagram of a method of transmitting a four-bit data word from a transmitting network device to a receiving network device.
Figure 8B:
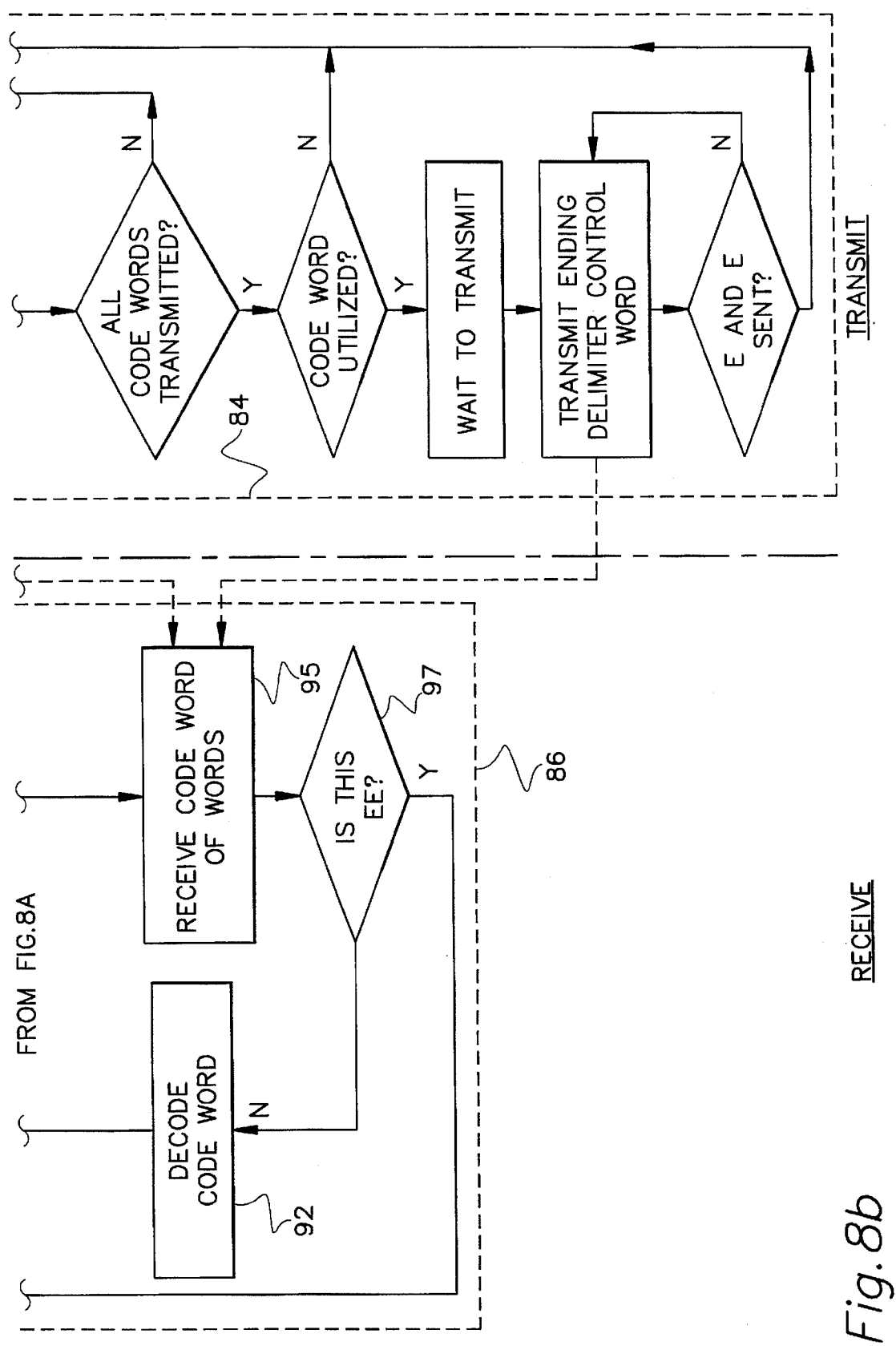

A method of transmitting and receiving a stream of data from one network device (the transmitting device) to a second network device (the receiving device) across a transmission medium (the network) is shown in FIG. 8.

First, the network devices are constantly waiting 80 for a transmission.

Secondly, if control words are being utilized, communication begins by transmitting 82 a stream of one or more eight-bit start delimiter control words, as described herein and in FIG. 1, across the network 83. The transmitting 82 of start delimiter control words is accomplished serially across the network. The transmitting device 84 transmits a start delimiter control word across the network. The start delimiter control word is received 88 and provided to the receiving device 86. Start delimiter control words are detected and distinguished from code words by executing 90 a series of comparisons executed prior to the execution 92 receiving device's decoding method. This process is repeated for all control words in the start delimiter control word stream. For the code of FIG. 1, the start delimiter control stream consists of S and T.

After all the start delimiter control words, if any, have been transmitted 82, the receiving device waits 93 and the code word itself must be transmitted 94. For the first code word, the code word is obtained as described herein. The code word representation of the data word is then transmitted 94 across the network by transmitting device 84 and received 95 from the network 83 by the receiving device 86. The code word is then decoded 92 and the data word to which the code word corresponds is provided to the receiving device as described herein. The method of decoding may be a look-up table or a series of comparisons; however, one embodiment is by the decoding method shown in FIG. 6 implementing the hashing algorithm. This process is repeated for the remainder of the data words in the data stream.

Finally, if control words are utilized, a stream of one or more eight-bit end delimiter control words are transmitted across the network. End delimiter control words are transmitted one by one across the network by the following method. First, the transmitting device transmits an end delimiter control word across the network. Next, the end delimiter control word is received and provided to the receiving device. End delimiter control words are detected 97 and distinguished from code words by a series of comparisons executed prior to execution 92 of the receiving device's decoding method. This process is repeated for all control words in the end delimiter control word stream. For the code of FIG. 1, the end delimiter control stream consists of EE.

Figure 9:
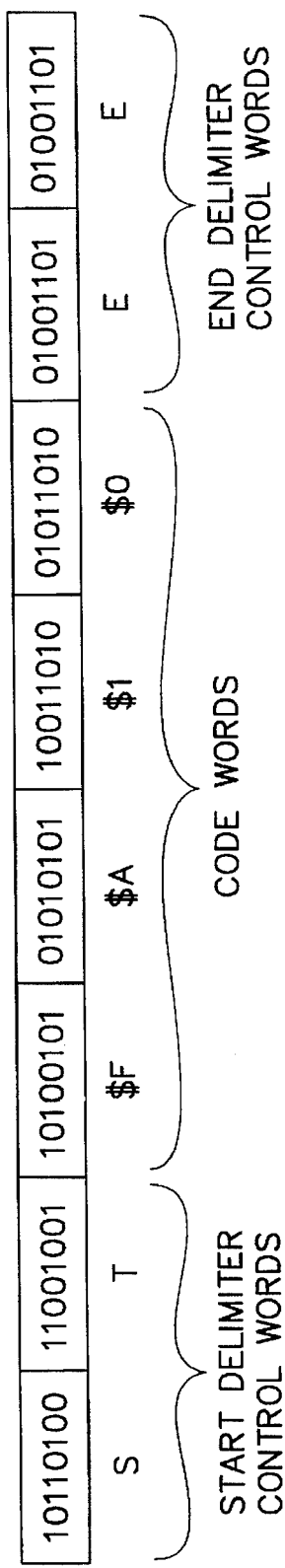
FIG. 9 is a typical data stream for a transmission using the code of FIG. 1.

For the code of FIG. 1, an example of a typical data stream is shown in FIG. 9. For the transmission module to transmit the data stream, hex address $FA10, the device first delimits the stream with the S and T, the first and second start delimiter control words. Next, the encoded code words corresponding to the data words hex F (15), A (10), 1 and 0 are transmitted. Finally, the transmission of EE, the end delimiter control word completes the transmission of the data stream.

Figure 10:
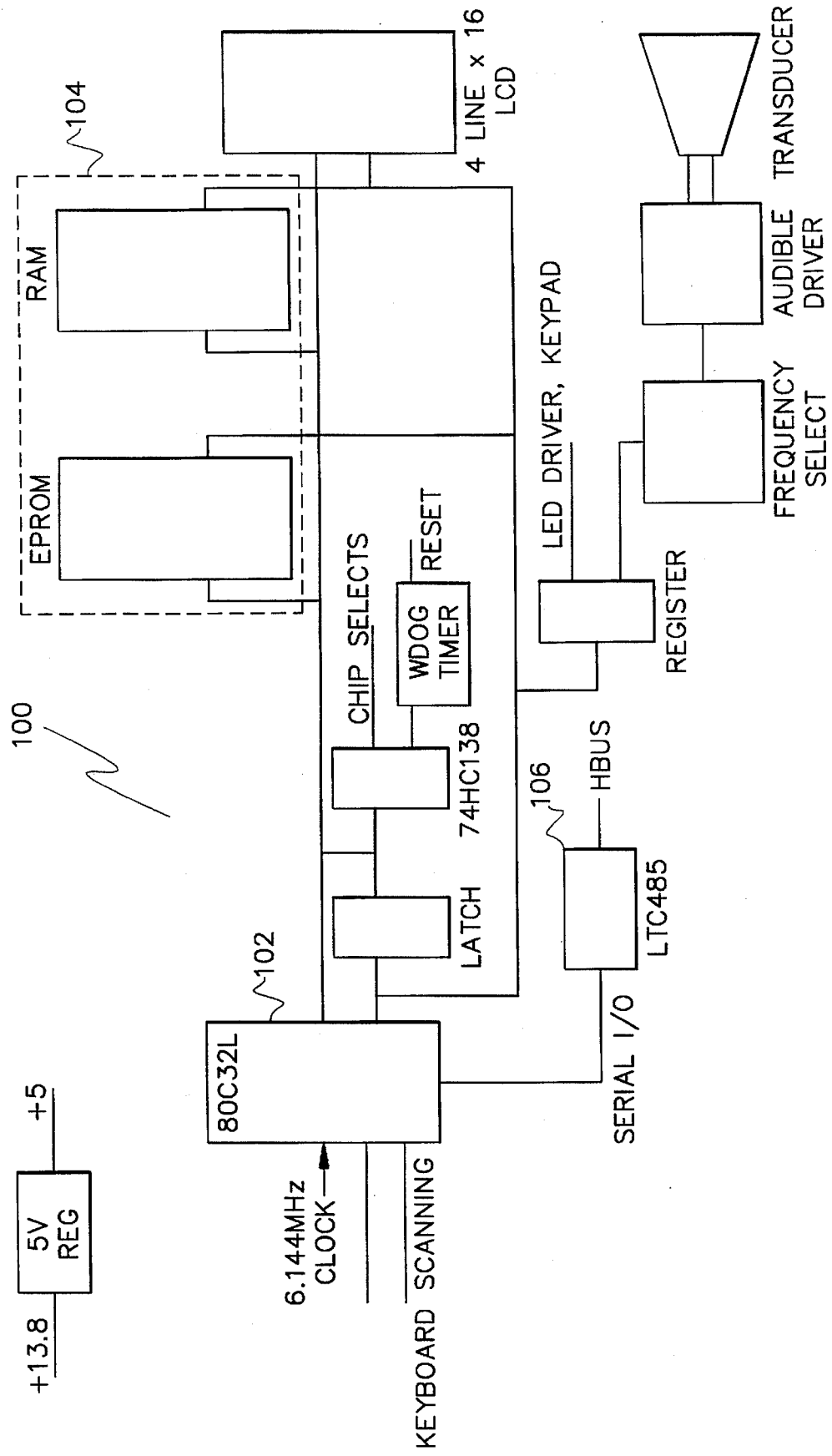
FIG. 10 is a block diagram of an apparatus for transmitting and receiving the code of the present invention.

Referring now to FIG. 10, an apparatus incorporating the code of the present invention as shown in FIG. 1 is described. Control device 100 comprises a processor means 102, a memory means 104 and a transceiver means 106. The code of FIG. 1 can be stored as a look-up table in memory means 104. When processor means 102 determines that a coded message is to be sent, such as by receiving an input from an operator, data words resulting from the input, and corresponding to the message to transmitted, are encoded by processor means 102. Encoding is done by processor means 102 referring to look-up table in memory means 104. Processor means 102 then retrieves the corresponding code word from memory means 104, and provides it to transceiver means 106 for transmission. Reception of a code word, or words, can be accomplished using the hardware elements described, in conjunction with an analogous process, and as further described herein.

It is therefore seen that the above invention is a unique code which may be used in a digital data communications system, with a number of advantages not previously found. It is not intended that the scope of the invention be limited by the specific disclosures used in connection with the preferred embodiment, but that they be viewed as particular embodiments of the invention as claimed herein.

What is claimed is:

1. A code for transmitting binary information for digital serial data communications which includes a plurality of code words, each code word comprising:

eight binary bits made up of four binary ones and four binary zeros, wherein each of said code words is inherently DC balanced;

consecutive identical bits in strings which are less than or equal to two, wherein the run-length limit within each of said code words is (0,1); and a first bit and a last bit which differ from adjacent bits within said word, wherein the run-length limit between two consecutive code words is (0,1);

further comprising, a plurality of control words, each of said control words comprising:

eight binary bits made up of four binary ones and four binary zeros, wherein each of said control words is inherently DC balanced; and consecutive identical bits in strings which are less than or equal to two, wherein the run-length limit within each of said control words is (0,1), wherein each code word in said plurality of code words is mapped to one and only one data word having four binary bits such that said data word may be generated by the steps of:

generating a masked code word by performing a logical AND operation between said code word and a mask word having eight binary bits;

generating a first bit group made up of a first four binary bits of said masked code word and a second bit group made up a second of four binary bits of said masked code word; and generating said data word by performing a logical OR operation between said first bit group and said second bit group.

2. The code of claim 1, wherein the plurality of control words comprises:

a first start delimiter control word which is transmitted at the beginning of a data transmission for delimiting the beginning of said data transmission;

a second start delimiter control word which is transmitted immediately following the transmission of said first start delimiter control word for further delimiting the beginning of the data transmission; and an end delimiter control word for delimiting the end of the data transmission.

3. The code of claim 2, wherein said first start delimiter control word is binary 10110100, said second start delimiter control word is binary 11001001, and said end delimiter control word is binary 01001101.

4. The code of claim 1, wherein said generating said data word step comprises generating said data word by performing a logical OR operation between said first bit group and said second bit group and reversing the result of said logical OR operation.

5. The code of claim 1, wherein a first four binary bits of said mask word are comprised of an upper mask having two binary ones, and wherein a last four binary bits of said mask word are comprised of a lower mask which is the inverse of said upper mask.

6. The code of claim 5 wherein said mask word is binary 10100101.

7. A method for generating a code for transmitting binary information for digital serial data communications, comprising the steps of:
   selecting from a set of 256 possible code words each having eight binary bits, a first intermediate subset of code words each having four binary ones and four binary zeros, wherein each code word in said first intermediate subset of code words is inherently DC balanced;
   selecting from said first intermediate subset of code words a second intermediate subset of code words each having consecutive identical bits in strings which are less than or equal to two, wherein a run-length limit within each of said code words in said second intermediate subset of code words is (0,1); and
   selecting from said second intermediate subset of code words a set of sixteen code words each having a first bit and a last bit which differ from adjacent bits within said code word, wherein a run-length limit between consecutive code words in said set of sixteen code words is (0,1); said method further comprising the step of mapping each code word in said set of sixteen code words to one and only one data word having four binary bits, wherein said mapping comprises:
      generating a masked code word by performing a logical AND operation between said code word and a mask word having eight binary bits;
      generating a first bit group made up of a first four binary bits of said masked code word and a second bit group made up of a second four binary bits of said masked code word; and
      generating said data word by performing a logical OR operation between said first bit group and said second bit group.

8. The method of claim 7, further comprising the steps of:
   selecting from said second intermediate subset of code words an intermediate subset of control words, wherein said intermediate subset of control words is made up of each code word in said second intermediate subset of code words which is not in said set of sixteen code words; and
   selecting from said intermediate subset of control words a set of control words, said set of control words selected to accomplish a chosen goal for said code.

9. The method of claim 7, wherein said generating said data word step comprises generating said data word by performing a logical OR operation between said first bit group and said second bit group and reversing the result of said logical OR operation.

10. The method of claim 7, wherein a first four binary bits of said mask word are comprised of an upper mask having two binary ones, and wherein a last four binary bits of said mask word are comprised of a lower mask which is the inverse of said upper mask.

11. The method of claim 10, wherein said mask word is binary 10100101.

12. A code for transmitting binary information for digital serial data communications, said code comprised of a plurality of code words, each code word in said code selected by a code generation method comprising the steps of:
   selecting from a set of 256 possible code words each having eight binary bits, a first intermediate subset of code words each having four binary ones and four binary zeros, wherein each code word in said first intermediate subset of code words is inherently DC balanced;
   selecting from said first intermediate subset of code words a second intermediate subset of code words each having consecutive identical bits in strings which are less than or equal to two, wherein a run-length limit within each of said code words in said second intermediate subset of code words is (0,1); and
   selecting from said second intermediate subset of code words a set of sixteen code words each having a first bit and a last bit which differ from adjacent bits within said code word, wherein a run-length limit between consecutive code words in said set of sixteen code words is (0,1), further comprising the step of mapping each of said code words in said set of sixteen code words to one and only one data word having four binary bits, wherein said mapping comprises:
      generating a masked code word by performing a logical AND operation between said code word and a mask word having eight binary bits;
      generating a first bit group made up of a first four binary bits of said masked code word and a second bit group made up of a second four binary bits of said masked code word; and
      generating said data word by performing a logical OR operation between said first bit group and said second bit group.

13. The code of claim 12, said code further comprising a set of control words, each control word in said code selected by said code generation method further comprising the steps of:
   selecting from said second intermediate subset of code words an intermediate subset of control words, wherein said intermediate subset of control words is made up of each code word in said second intermediate subset of code words which is not in said set of sixteen code words; and
   selecting from said intermediate subset of control words said set of control words, said set of control words selected to accomplish a chosen goal for said code.

14. The code of claim 13, wherein said set of control words comprises:
   a first start delimiter control word which is transmitted at the beginning of a data transmission for delimiting the beginning of said data transmission;
   a second start delimiter control word which is transmitted immediately following the transmission of said first start delimiter control word for further delimiting the beginning of the data transmission, and
   an end delimiter control word for delimiting the end of the data transmission.

15. The code of claim 14, wherein said first start delimiter control word is binary 10110100, said second start delimiter control word is binary 11001001, and said end delimiter control word is binary 01001101.

16. The code of claim 12, wherein said generating said data word step comprises generating said data word by performing a logical OR operation between said first bit group and said second bit group and reversing the result of said logical OR operation.

17. The code of claim 12, wherein a first four binary bits of said mask word are comprised of an upper mask having two binary ones, and wherein a last four binary bits of said mask word are comprised of a lower mask which is the inverse of said upper mask.

18. The code of claim 17, wherein said mask word is binary 10100101.

19. A system for transmitting binary information for digital serial data communications between two or more network devices over a transmission medium connected between all of said network devices, each network device comprising:

a processing module for controlling the operation of said network device;

a transmission module for transmitting outgoing binary information received from said processing module across said transmission medium to other network devices using outgoing encoded binary information comprised of a plurality of code words in a set of sixteen code words each having eight binary bits, wherein each code word is selected from a set of 256 code words such that each code word has four binary ones and four binary zeros, such that said code word is inherently DC balanced, has consecutive identical bits in strings which are less than or equal to two such that the run-length limit within said code word is (0,1), and has a first bit and a last bit which differ from adjacent bits within said code word such that the run-length limit between two consecutive code words is (0,1); and a reception module for receiving incoming encoded binary information from other network devices across said transmission medium and providing decoded incoming binary information to said processing module, wherein said reception module comprises:

a reception means for serially receiving said incoming encoded binary information from said transmission medium, said incoming encoded binary information made up of a plurality of code words from the set of sixteen code words;

a decoding means for decoding a code word in said incoming encoded binary information received by said reception means into the corresponding data word;

a reception data providing means for providing said data word decoded by said decoding means to said processing module; and a reception processing means for controlling the operation of said reception module, wherein said decoding means operates via a decoding method comprising the steps of:

generating a masked code word by performing a logical AND operation between said code word and a mask word having eight binary bits;

generating a first bit group made up of a first four most significant binary bits of said masked code word and a second bit group made up of a second four binary bits of said masked code word;

generating an index by performing a logical OR operation between said first bit group and said second bit group; and providing said data word to said reception processing means such that said data word is equivalent to said index.

20. The system of claim 19, wherein said transmission module comprises:

a transmission data retrieving means for retrieving said outgoing binary information from said processing module, said outgoing binary information made up of a plurality of data words, each having four binary bits;

an encoding means for encoding each data word in said outgoing binary information received by said transmission data retrieving means into a unique code word from the set of sixteen code words;

a transmission means for serially transmitting a code word encoded by said encoding means across said transmission medium; and a transmission processing means for controlling the operation of said transmission module.

21. The system of claim 20, wherein said transmission processing means is a subsystem of said processor module.

22. The system of claim 19, wherein said reception processing means is a subsystem of said processor module.

23. The system of claim 19, wherein said decoding method further comprises, after said generating an index step, the steps of:

obtaining a reference word from a decoder look-up table referenced by said index;

comparing said reference word to said code word; and indicating to said reception processing means that a violation word has been received if said reference word is not equal to said code word.

24. The system of claim 19, wherein a first four binary bits of said mask word are comprised of an upper mask having two binary ones, and wherein a last four binary bits of said mask word are comprised of a lower mask made up of the inverse of said upper mask.

25. The system of claim 24, wherein said mask word is binary 10100101.

26. The system of claim 19, wherein each network device is implemented in a commercially-available microcontroller.

27. The system of claim 20, wherein said transmission means is implemented in a commercially-available universal asynchronous receiver/transmitter (UART).

28. The system of claim 19, wherein said reception means is implemented in a commercially-available universal asynchronous receiver/transmitter (UART).

29. The system of claim 19, wherein said transmission module transmits a start delimiter control word stream immediately prior to transmitting said outgoing encoded binary information, said start delimiter control word stream having at least one start delimiter control word having eight binary bits, said transmission module transmits an end delimiter control word stream immediately after transmitting said outgoing encoded binary information, said end delimiter control word stream having at least one end delimiter control word having eight binary bits, said reception module receives said start delimiter control word stream immediately prior to receiving said incoming encoded binary information, and said reception module receives said end delimiter control word stream immediately after receiving said incoming encoded binary information.

30. The system of claim 29, wherein said start delimiter control word stream comprises a first start delimiter control word and a second start delimiter control word.

31. The system of claim 30, wherein said first start delimiter control word is binary 10110100 and said second start delimiter control word is binary 11001001.

32. The system of claim 29, wherein said end delimiter control word stream is comprised of an end delimiter control word.

33. The system of claim 32, wherein said end delimiter control word is binary 01001101.

34. A method for transmitting a data stream of binary information for digital serial data communications between a transmitting device and a receiving device, comprising the steps of:

obtaining a data word having four binary bits from said transmitting device;

encoding said data word into a code word made up of eight binary bits selected from a set of sixteen code words, each code word having eight binary bits, wherein each code word has been selected from 256 possible code words, wherein said code word comprises four binary ones and four binary zeros, such that said code word is inherently DC balanced, consecutive identical bits in strings which are less than or equal to two, such that the run-length limit within said code word is (0,1), and a first bit and a last bit that differ from adjacent bits within said word, such that the run-length limit between two consecutive words is (0,1);

transmitting said code word serially using a transmission medium;

receiving said code word from the transmission medium;

decoding said code word into said data word corresponding to said code word;

providing said data word to said receiving device; and repeating all of the said steps for the next data word in said data stream until all data words in said data stream have been transmitted, wherein said decoding step comprises the steps of:

generating a masked code word by performing a logical AND operation between said code word and a mask word having eight binary bits;

generating a first bit group made up of a first four binary bits of said masked word and a second bit group made up of a second four binary bits of said masked word;

generating an index by performing a logical OR operation between said first bit group and said second bit group; and generating said data word from said index such that said data word is equivalent to said index.

35. The method of claim 34, wherein said decoding step further comprises, after said generating an index step, the steps of:

obtaining a reference word from a decoder look-up table referenced by said index;

comparing said reference word to said code word; and indicating to said receiving device that a violation word has been received if said reference word is not equal to said code word.

36. The method of claim 34, wherein a first four binary bits of said mask word are comprised of an upper mask having two binary ones, and wherein a last four binary bits of said mask word are comprised of a lower mask which is the inverse of said upper mask.

37. The method of claim 36, wherein said mask word is binary 10100101.

38. A method for transmitting a data stream of binary information for digital serial data communications between a transmitting device and a receiving device, comprising the steps of:

transmitting a start delimiter control word stream comprising at least one start delimiter control word from said transmitting device to said receiving device using a transmission medium;

transmitting an encoded data stream comprising at least one code word from a set of sixteen code words, each code word having four binary ones and four binary zeros, such that said code word is inherently DC balanced, consecutive identical bits in strings which are less than or equal to two, such that a run-length limit within said code word is (0,1), a first bit and a last bit which differ from adjacent bits within said word, such that a run-length limit between two consecutive code words is (0,1), and corresponding to a unique data word from said data stream, said data stream comprised of at least one data word having four binary bits, from said transmitting device to said receiving device using the transmission medium; and transmitting an end delimiter control word stream comprising at least one end delimiter control word from said transmitting device to said receiving device using a transmission medium, wherein said transmitting an encoded data stream comprises the steps of:

obtaining a data word from said data stream;

encoding said data word into the corresponding code word in the set of sixteen code words;

transmitting said code word serially using the transmission medium;

receiving said code word from the transmission medium;

decoding said code word into said data word corresponding to said code word;

providing said data word to said receiving device; and repeating all of said steps in said transmitting an encoded data stream for any subsequent data words in said data stream until all data words in said data stream have been transmitted, wherein said decoding step comprises the steps of:

generating a masked code word by performing a logical AND operation between said code word and a mask word having eight binary bits;

generating a first bit group made up of a first four binary bits of said masked code word and a second bit group made up of a second four binary bits of said masked code word;

generating an index by performing a logical OR operation between said first bit group and said second bit group; and generating said data word from said index such that said data word is equivalent to said index.

39. The method of claim 38, wherein said transmitting a start delimiter control word stream comprises the steps of:

transmitting a start delimiter control word using the transmission medium;

receiving said start delimiter control word from the transmission medium;

providing said start delimiter control word to said receiving device;

repeating all of said steps in said transmitting a start delimiter control word stream for any subsequent start delimiter control words in said start delimiter control word stream until the entire start delimiter control word stream has been transmitted.

40. The method of claim 38, wherein said transmitting an end delimiter control word stream comprises the steps of:

transmitting an end delimiter control word using the transmission medium, said end delimiter control word stream at the end of said encoded data stream;

receiving said end delimiter control word from the transmission medium;

providing said end delimiter control word to said receiving device;

repeating all of said steps in said transmitting an end delimiter control word stream for any subsequent end delimiter control words in said end delimiter control word stream until the entire end delimiter control word stream has been transmitted.

41. The method of claim 38, wherein said decoding step further comprises, after said generating an index step, the steps of:

obtaining a reference word from a decoder look-up table referenced by said index;

comparing said reference word to said code word; and indicating to said receiving device that a violation word has been received if said reference word is not equal to said code word.

42. The method of claim 38, wherein a first four binary bits of said mask word are comprised of an upper mask having two binary ones, and wherein a last four binary bits of said mask word are comprised of a lower mask which is the inverse of said upper mask.

43. The method of claim 42, wherein said mask word is binary 10100101.

44. The method of claim 38, wherein said start delimiter control word stream comprises a first start delimiter control word and a second start delimiter control word.

45. The method of claim 44, wherein said first start delimiter control word is binary 10110100 and said second start delimiter control word is binary 11001001.

46. The method of claim 38, wherein said end delimiter control word stream is comprised of an end delimiter control word.

47. The method of claim 46, wherein said end delimiter control word is binary 01001101.

* * * * *